F. Nishwitz.

Mower.

Nº 19377
Nº 44
Nº 1149

Patented Feb. 16, 1858
Reissued Mar. 5, 1861

Sheet 2. 2 Sheets

F. Nishwitz.

Mower.

No 19377
No 44
No 1149

Patented Feb. 16, 1858
Reissued Mar. 5, 1861

UNITED STATES PATENT OFFICE.

F. NISHWITZ, OF BROOKLYN, NEW YORK.

IMPROVEMENT IN HARVESTERS.

Specification forming part of Letters Patent No. 19,377, dated February 16, 1858; Reissue No. 1,149, dated March 5, 1861.

*To all whom it may concern:*

Be it known that I, F. NISHWITZ, of the city of Brooklyn, in the county of Kings and State of New York, have invented a new and useful Improvement in Harvesters; and I do hereby declare that the following is a full, clear, and exact description of the same, reference being had to the annexed drawings, making a part of this specification, in which—

Figure 1:
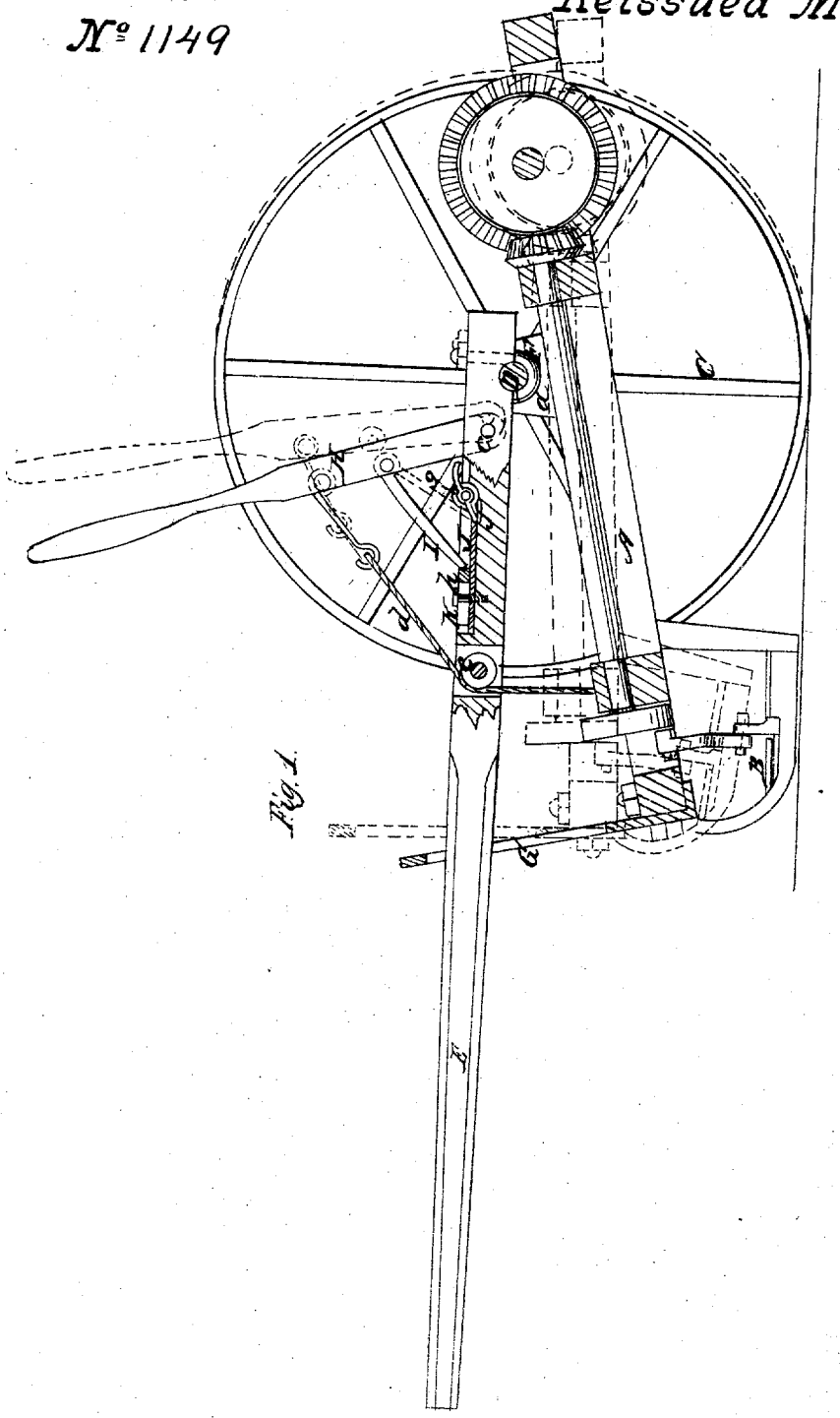
Figure 2:
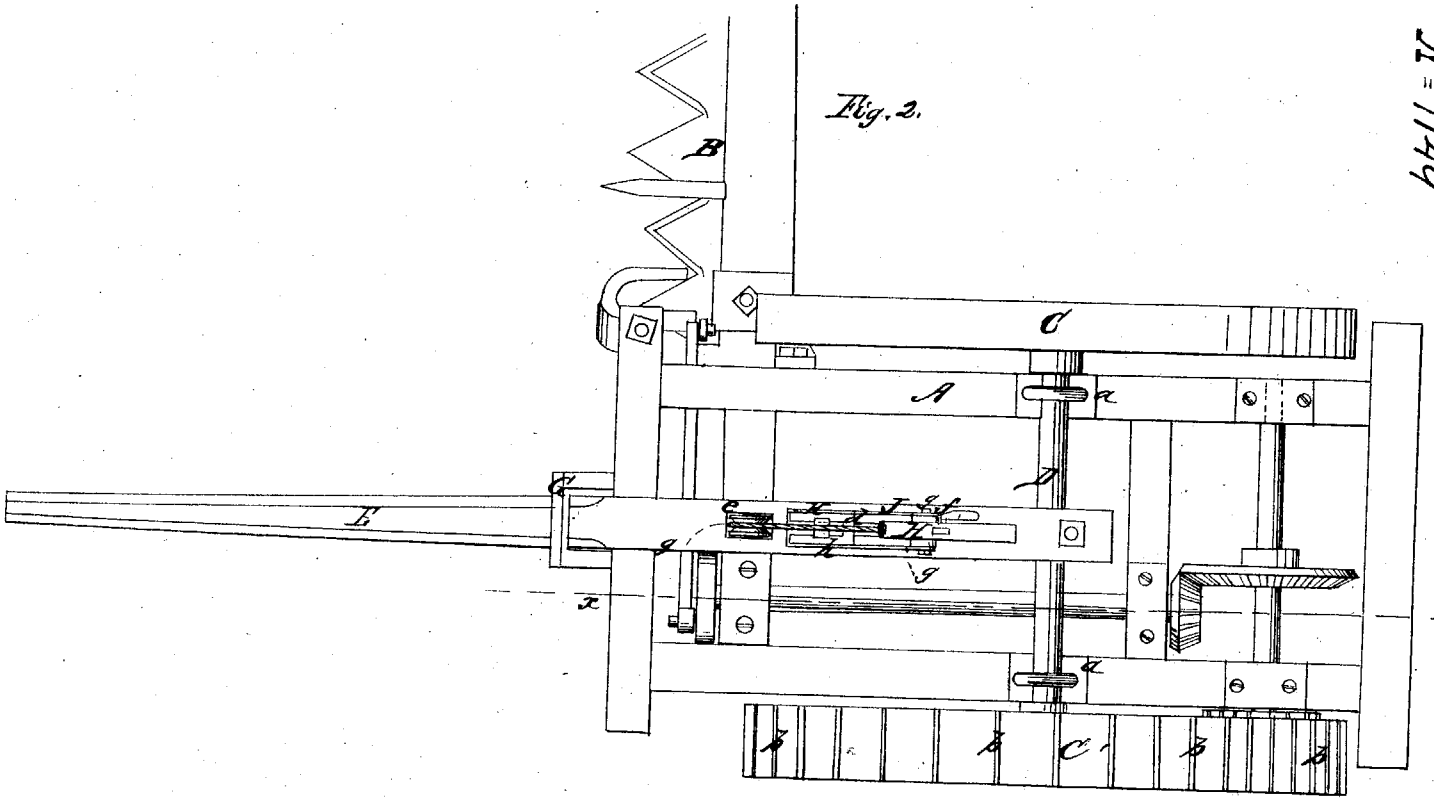

Figure 1 is a sectional elevation of my improvement, taken in the line *x x*, Fig. 2, a portion of the draft-pole being also broken away, as indicated by the line *y y*, Fig. 2. Fig. 2 is a plan or top view of the same.

Similar letters of reference indicate corresponding parts in the two figures.

This invention of mine consists in the means employed for adjusting the cutter-bar and cutters in reference to their height from the surface of the ground.

To enable others skilled in the art to understand fully and construct my invention, I will proceed to describe it.

A represents the main frame of a harvester, and B the cutters and cutter-bar attached to the front end of said frame. The frame A is of rectangular form, constructed in the usual way, and the cutters and cutter-bar are attached to the frame in the ordinary or any suitable manner. The frame A is mounted on two wheels, C C, the axle D of which is permanently attached to the frame near the center thereof, and secured to projections thereon. The wheels C of course are fitted loosely on the axle, the latter being stationary. The wheel C which is the driving-wheel has its periphery provided with projecting teeth or ledges *b*, to prevent its slipping. Motion is communicated to the knives or cutters from the driving-wheel by any of the known means now employed for such purpose.

E represents the draft-pole, the back end of which is connected by a metal strap or loop, F, being fitted loosely on the axle D, so that the latter may turn freely without affecting the draft-pole. The draft-pole passes through a guide-plate, G, which is attached to the front end of the frame A. To the back end of the draft-pole E the lower end of a lever, H, is pivoted, as seen at C. This lever has a cord or chain, *d*, attached to it at about its center, which, passing over a pulley, *e*, in the pole E, is attached to the front end of the frame A, which carries the cutting apparatus.

To the lever H a pawl, I, is attached. Said pawl, when the lever H is drawn fully back, catches behind a plate, J, fitted in the pole E, and on the front end of a small lever, *f*, the fulcrum of which is at *g*.

To the front part of the plate J a stop, K, is attached. This stop is slotted longitudinally, and is secured to the plate J by a set-screw, *h*, so that it may be adjusted nearer to or farther from the back end of the plate.

From the above description it will be seen that when the upper end of the lever H is drawn or shoved fully back, the pawl I will catch behind the back end of plate J, and the cord or chain D will elevate the front end of the frame A and the cutter-bar and cutters, the pole E of course being kept at a certain height about in a horizontal position, as it is attached to and held up by the team. The cutters and cutter-bar and finger-bar, when the lever H is shoved fully back, are elevated sufficiently high from the surface of the ground to clear ordinary obstructions, and the machine may be drawn from place to place without difficulty, and may be backed very readily. The driver may let down the cutters at at any time by merely placing his foot on the back end of the lever *f*, the front end of said lever being thereby thrown up and liberating the pawl I, so that the cutters and the front end of the frame will fall by their own gravity, the stop K keeping the cutters and frame the desired height from the surface of the ground, the said height being regulated by adjusting said stop. The back end of the pole should be attached near the center of the fulcrum of the machine, near the axle, so that the act of backing will partially elevate the cutters, and when the machine is moved forward they will at once drop to the surface of the ground, unless held in position by means of the pawl and stop. As the machine is drawn along, the front end of the frame and the cutters will remain depressed by their own gravity, the cutters and finger-beam rising when passing over small obstructions or elevations; and when backed the draft-pole will, in consequence of being connected to the machine at or near its center of fulcrum, throw up the front end of the frame and the cutters, as shown in red, Fig. 1, which is of great service in backing, turning round, or turning at the corners, as the cutters are raised from the ground and above the cut grass or grain, and will immediately fall to ground again as the machine moves forward.

Having thus fully described my invention, what I claim, and desire to secure by reissued Letters Patent, is as follows:

1. The arrangement of an adjustable lever directly connected with the tongue or pole for elevating the cutting apparatus, and to hold it at any desired height, as and for the purpose herein set forth.

2. Said lever, in combination with the pole, chain, or cord, the frame, and the finger-bar, said pole being attached at its rear end near the center of the machine, as and for the purpose herein set forth.

3. In combination with the said lever and pole, the pawl and treadle operating jointly, in the manner and for the purpose specified.

4. The combination of the lever, pawl, and treadle with the adjustable stop K, substantially as described, for the purposes specified.

F. NISHWITZ.

Witnesses:
H. U. SOPER,
E. D. SHIPMAN.